United States Patent
Jankowski

(10) Patent No.: US 12,091,093 B2
(45) Date of Patent: Sep. 17, 2024

(54) OVERLAY FLOOR FOR MOTOR VEHICLES

(71) Applicant: OKB SPOLKA Z OGRANICZONA ODPOWIEDZIALNOSCIA, Bukowiec (PL)

(72) Inventor: Marcin Piotr Jankowski, Bukowiec (PL)

(73) Assignee: OKB Spolka z Ograniczona Odpowiedzialnoscia, Bukowiec (PL)

( * ) Notice: Subject to any disclaimer, the term of this patent is extended or adjusted under 35 U.S.C. 154(b) by 0 days.

(21) Appl. No.: 18/288,922

(22) PCT Filed: Nov. 29, 2021

(86) PCT No.: PCT/PL2021/000088
§ 371 (c)(1),
(2) Date: Oct. 30, 2023

(87) PCT Pub. No.: WO2022/245227
PCT Pub. Date: Nov. 24, 2022

(65) Prior Publication Data
US 2024/0208586 A1    Jun. 27, 2024

(30) Foreign Application Priority Data
May 17, 2021   (PL) .......................................... 437877

(51) Int. Cl.
*B62D 25/20*   (2006.01)
*B60N 2/015*   (2006.01)

(52) U.S. Cl.
CPC ............. *B62D 25/20* (2013.01); *B60N 2/015* (2013.01)

(58) Field of Classification Search
CPC ........ B60N 2/015; B60P 7/0807; B62D 25/20
See application file for complete search history.

(56) References Cited

U.S. PATENT DOCUMENTS

| 7,350,853 B2* | 4/2008 | Fitze | B62D 29/005 |
| | | | 410/104 |
| 8,714,633 B2* | 5/2014 | Wary | B32B 3/04 |
| | | | 296/184.1 |
| 2016/0152281 A1* | 6/2016 | Hansen | B60N 2/01558 |
| | | | 29/458 |

FOREIGN PATENT DOCUMENTS

| DE | 20118424 U1 | 2/2002 |
| DE | 102009021777 A1 | 11/2010 |

(Continued)

OTHER PUBLICATIONS

International Search Report and Written Opinion issued by the International Searching Authority for corresponding International application No. PCT/PL2021/000088, mailed on Mar. 31, 2022.

*Primary Examiner* — Joseph D. Pape
(74) *Attorney, Agent, or Firm* — Myers Wolin, LLC

(57) ABSTRACT

An overlay floor for motor vehicles, applied on the mother floor of the vehicle, intended to fix seats, wheelchairs or other equipment therein, where the overlay floor has a shape adapted to the mother floor of the vehicle in which it is to be mounted and is formed of a main plate and load-bearings rails in which seats and sofas are slidably fastened, where in the floor plate are made longitudinal sockets in which load-bearings rails are placed where the sockets are made in the entire panel of the main board as through, longitudinal openings for the profiles of the load-bearings rails and the load-bearings rails have the dimensions of these openings, i.e. their width is equal to the width of the longitudinal sockets in the main board and their length is equal to length of the longitudinal sockets in the main plate.

4 Claims, 1 Drawing Sheet

(56) References Cited

FOREIGN PATENT DOCUMENTS

| | | |
|---|---|---|
| GB | 2419573 A | 5/2006 |
| RU | 71 588 U1 | 3/2008 |
| RU | 2376408 C2 | 12/2009 |
| WO | 2015/078288 A1 | 6/2015 |

* cited by examiner

OVERLAY FLOOR FOR MOTOR VEHICLES

CROSS REFERENCE TO RELATED APPLICATIONS

The present application is a U.S. National Phase under 35 U.S.C. 371 of International Patent Application Serial No. PCT/PL2021/000088 filed on Nov. 29, 2021, which claims priority to Polish Application P.437877, filed on May 17, 2021, the contents of each of which are incorporated by reference in their entirety for all purposes.

FIELD OF THE INVENTION

The subject of the invention is an overlay floor for motor vehicles, applied on the mother floor of the vehicle, intended to fix seats, wheelchairs or other equipment therein.

BACKGROUND

From the description of the Polish utility model no. Ru71588, an overlay floor is known, which has longitudinal mounting sockets in which mounting rails with a shaped groove for connecting elements of the equipment are placed. The overlay floor plate is layered, the bottom layer of which is made of a load-bearing plate, the top layer is a decorative plate, and between the load-bearing plate and the decorative plate there is a filling layer. In the decorative plate and in the filling layer, longitudinal mounting sockets are made, in which the mounting rails are embedded, and the bottom of the mounting sockets is a load-bearing plate and the sides of the mounting rails closely adjoin the side walls of the mounting sockets. The mounting rails have longitudinal flanges protruding along their entire length beyond the outline of the mounting sockets, so that the mounting rails lie with the flanges on the upper surface of the decorative plate. There is a shaped groove with a cross-section in the form of an inverted T-letter between the flanges. The mounting rails are attached to the walls and bottoms of the mounting sockets with glue.

SUMMARY

From the patent description WO20150078288, an overlay floor is known, in which the longitudinal mounting rails are support profiles with longitudinal flanges at the top and with a shaped groove for fixing equipment between the flanges. The profiles have wide bases at the bottom, the bottom surfaces of which are used to place the rails on the vehicle's mother floor, and layered (or monolithic) plates are placed on the top surfaces of the base profiles so that the edges of the plates are below the flanges in the recesses between the flanges and the base. The base profiles presented in the description are high, therefore, in order to eliminate the large deflection of the plate between adjacent rails, support rails are placed in the middle of the distance between the rails, parallel to the mounting rails.

The main plate consists of small pieces that are laid one after the other between the load-bearing rails.

According to the invention, in the overlay floor, the load-bearing rails have a width equal to the width of the longitudinal sockets in the main plate and have a length equal to the length of the longitudinal sockets in the main plate. The load-bearing rails, at least along the side walls, have along their entire length shaped relief cuts for gaskets, which are placed between the side walls of the load-bearing rails and the walls of the longitudinal sockets. The height of the load-bearing rails, measured from the upper surfaces of the wide bases, is at least equal to the thickness of the complete main plate.

The gaskets have top flanges that rest on the top of the main board.

The relief cuts are best provided on the top of the side walls of the load-bearings rails near the surface of the main plate and on the top surface of the load-bearing rails and in the relief cuts, gaslets are placed. The upper flanges of the gaskets lie on the top surface of the main plate.

It is preferred, when the gasket between the side walls of the load-bearing rails and the side walls of the longitudinal sockets is the top covering, in which the openings have a length equal to the length of the load-bearing rails and their width is smaller than the width of the longitudinal sockets by the depth of the relief cuts in the side walls of the load-bearing rails.

The overlay floor according to the invention is an independent part, it is adjusted to a given vehicle, it is self-supporting, it is a good thermal and sound barrier of the interior of the vehicle from the floor. It is possible to freely arrange the vehicle space—to install chairs, wheelchairs, loads. The floor improves the pressure distribution, distributing point loads over its entire surface, it is rigid, which also increases the stiffness of the vehicle and reduces vibrations transmitted to the passengers or the load. The main board can be a sandwich structure with a laminated board at the bottom, on which there is a foam covered with another laminate board and a decorative covering. The installation of the floor according to the invention is simple, as will be explained later in the description.

BRIEF DESCRIPTION OF THE DRAWINGS

The subject of the invention is shown in the embodiment in the drawing, in which.

DETAILED DESCRIPTION OF THE PREFERRED EMBODIMENTS

Figure 1:
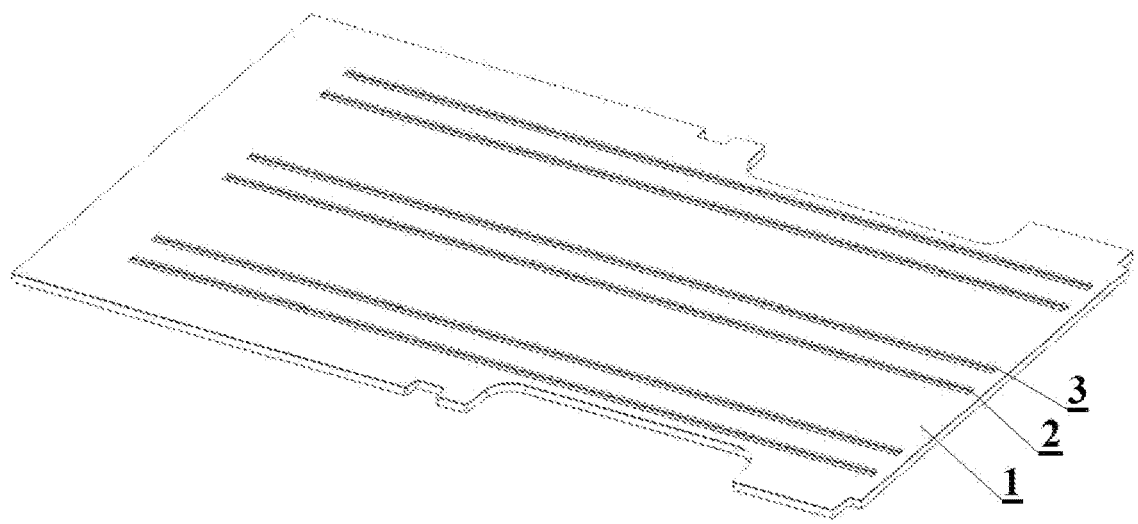
FIG. 1 shows a perspective view of an overlay floor.
Figure 2:
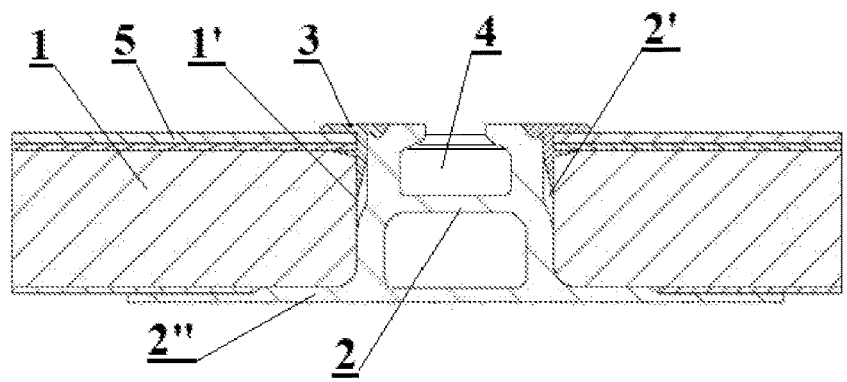
FIG. 2 shows a cross-section of the overlay floor.
Figure 3:
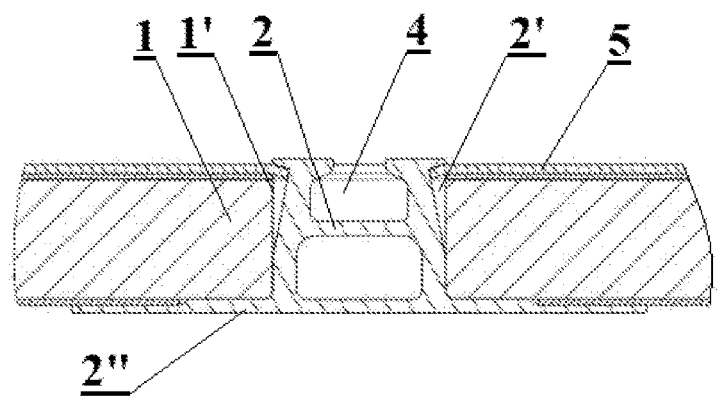
FIG. 3 shows the same cross-section of another version of the overlay floor.

As shown in FIG. 1, the overlay floor has a shape adapted to the mother floor of the vehicle in which it is to be mounted and is formed of a main plate 1 and load-bearings rails 2 in which seats and sofas are slidably fastened. As shown in FIGS. 2 and 3, in the floor plate 1, in this embodiment being a layered plate, consisting of three layers glued together and with a decorative covering on top, are made longitudinal sockets 1', in which load-bearings rails 2 are placed. The sockets 1' are made in the entire panel of the main board 1 as through, longitudinal openings for the profiles of the load-bearings rails 2. The load-bearings rails 2 have the dimensions of these openings, i.e. their width is equal to the width of the longitudinal sockets 1' in the main board 1 and their length is equal to length of the longitudinal sockets 1' in the main plate 1. The load-bearing rails 2 on the side walls have, along their entire length, relief cuts 2' for gaskets 3, which are placed between the side walls of the load-bearing rails 2 and the longitudinal walls of the sockets 1'. The load-bearing rails 2 are slightly higher than the main board 1 (including the decorative covering 5), they slightly protrude above the level of the main board 1 and thus dirt does not fall into the shaped groove 4 in the load-bearing rails 2, does not contaminate it and does not obstruct the movement of the seats. in the load-bearing rails 2. To additionally protect the shaped groove 4 against contamination, the gaskets 3 have upper flanges 3', which are placed on the upper surface of the main plate 1, and more precisely on the surface of the decorative covering 5 placed on the upper surface of the main plate 1. As shown in FIG. 2, relief cuts 2' are made on the upper part of the side walls of the load-bearing rails 2 near the surface of the main plate 1 and on the top face of the load-bearing rails 2 and in the relief cuts 2', gaskets 3 are placed. As shown in FIG. 3, a gasket between the side walls of the load-bearing rails 2 and the side walls of the longitudinal sockets is the upper covering 5, in which the openings have a length equal to the length of the load-bearing rails 2 and their width is less than the width of the longitudinal sockets 1' for the depth of the relief cuts 2' in the side walls of the load-bearing rails 2. Hence, a latch is created from this surplus of the covering 5 by which the decorative covering 5 snaps into the relief cuts 2' of the load-bearing rails 2 and then it becomes a sealing element.

The installation of the floor in the vehicle is simple and results from the design of the overlay floor.

It can be made in various ways, i.e. load-bearing rails 2 are first arranged on the vehicle's mother floor and glued with the lower bases 2" to the vehicle mother floor. Then, the main plate 1 is placed on the profiles of the load-bearing rails 2 with the settling sockets 1' and the gaskets 3 are placed. Another method of installation consists of preparing the complete overlay floor outside the vehicle and fixing the whole on the mother floor of the vehicle. Then the load-bearing rails 2 profiles are inserted from the bottom of the main plate 1 (they can be joined with a layer of glue), then the gaskets 3 are placed from above.

In the version shown in FIG. 3, the main board 1 is placed on the load-bearing rails 2 glued to the mother floor, and then the decorative covering 5 is snapped into the relief cuts 2' of the load-bearing rails 2, sealing the connection of the load-bearing rails 2 with the sockets 1' or the installation is made outside the vehicle. and the whole board is glued to the mother floor of the vehicle.

An overlay floor according to the invention is attached to the mother floor of the vehicle by gluing or screwing, using appropriate reinforcement pads if necessary.

The invention claimed is:

1. An overlay floor for motor vehicles, intended to be attached to a mother floor of the vehicle, comprising longitudinal sockets in a main plate with rails placed in these sockets for an attachment of connecting elements of seats or other equipment therein, which the rails have a longitudinal, shaped groove for the connecting elements of the equipment, made in the form of a uniform plate, for laying on the mother floor of the motor vehicle, reflecting a shape of the mother floor, wherein the load-bearing rails have at the bottom, wide bases for laying on the mother floor of the vehicle, wherein on an upper surface of their wide bases there is a load-bearing plate, wherein the load-bearing rails (2) have a width equal to the width of longitudinal sockets (1') in the main plate (1) and have a length equal to the length of the longitudinal sockets (1') in the main plate (1), and the load-bearing rails (2) at least on side walls having along their entire length shaped relief cuts (2') for gaskets (3), which are placed between the side walls of the load-bearing rails (2) and walls of the longitudinal sockets (1'), and the height of the load-bearing rails (2) measured from an upper surface of the wide bases (2") being at least equal to thickness of the main plate (1).

2. The floor according to the claim 1, wherein the gaskets (3) have upper flanges that lie on an upper surface of the main plate (1).

3. The floor according the claim 1, wherein the relief cuts (2') are provided on an upper part of the side walls of the load-bearing rails (2) at a surface of the main plate (1) and on an upper surface of the load-bearing rails (2), and the gaskets (3) are provided in the relief cuts (2'), and upper flanges of the gaskets (3) being arranged on an upper surface of the main plate (1).

4. The floor according to the claim 1, wherein the gasket between the side walls of the load-bearing rails (2) and the side walls of the longitudinal sockets (1') is a top covering (5) in which openings have a length equal to the length of the load-bearing rails (2) and their width is smaller than the width of the longitudinal sockets (1') by the depth of the relief cuts (2') in the side walls of the load-bearing rails (2).

* * * * *